Patented Sept. 22, 1953

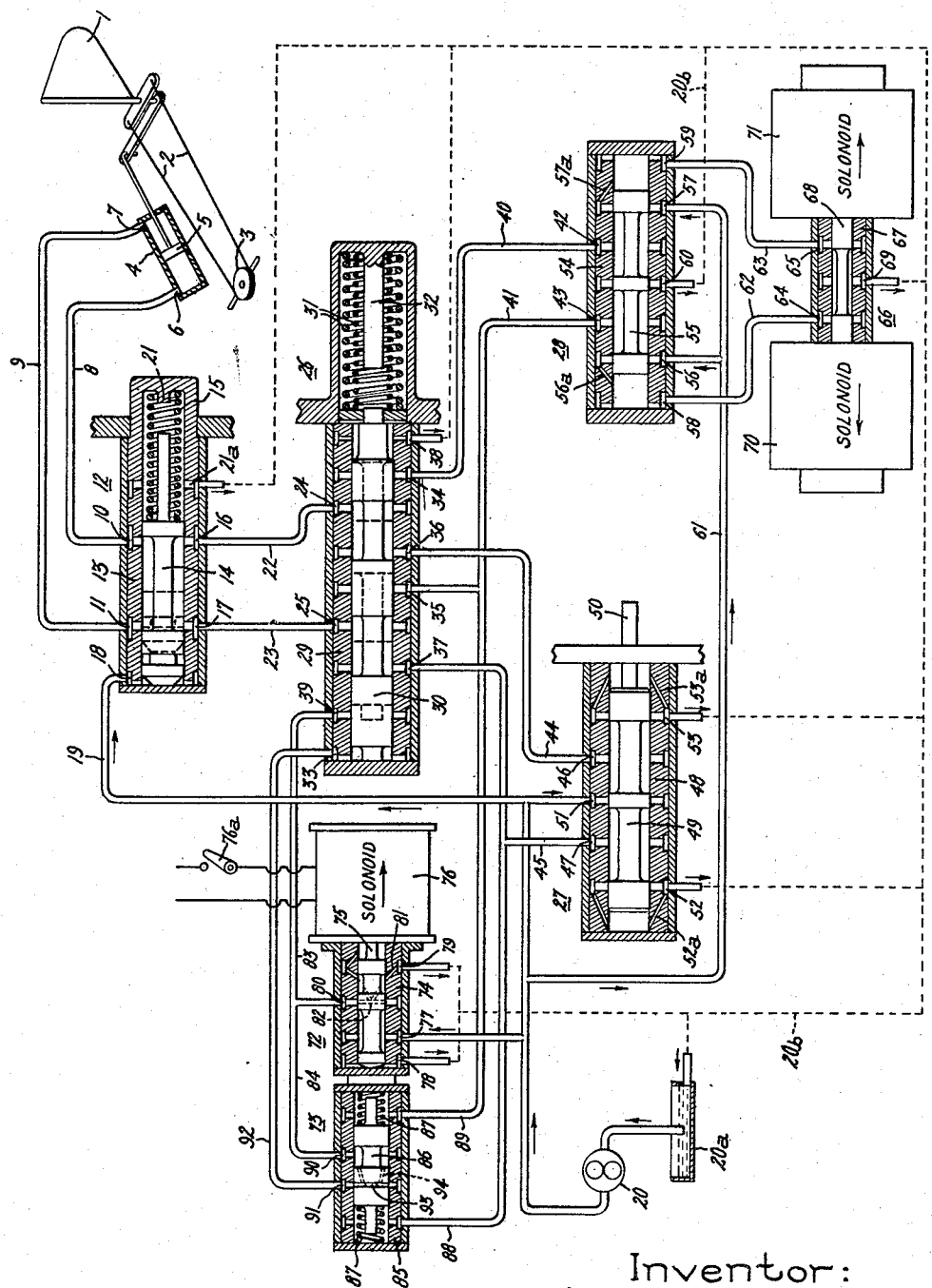

2,652,812

UNITED STATES PATENT OFFICE 2,652,812

COMBINED MANUAL AND AUTOMATIC HYDRAULIC SERVOMOTOR APPARATUS

Edward J. Fenzl, Schenectady, N. Y., assignor to General Electric Company, a corporation of New York Application May 13, 1952, Serial No. 287,656

12 Claims. (Cl. 121—38)

1

My invention relates to hydraulic servomotor apparatus, and more particularly to synchronizing apparatus for controlling the transfer of servomotor control from one to another of a pair of selectable hydraulic relay valves. The invention is particularly applicable to hydraulic servomotor systems in which one relay valve is manually controlled and the other is automatically controlled in response to a condition, such as in aircraft equipped with both manual and autopilot controls.

In servomotor control of aircraft where a hydraulic servomotor is utilized to move a control surface, such as a rudder, elevator or aileron, it is known to provide a hydraulic relay valve controlled manually for power boost manual control of flight, a second hydraulic relay valve automatically controlled by an autopilot for automatic control in accordance with plane attitude, and a transfer valve for selectably connecting one or the other of the relay valves to control the servomotor. Since the human pilot and the autopilot exert entirely independent controlling influences, care must be exercised in transferring from one type of control to the other to ensure that both controls, and more particularly both relay valves, are calling for the same direction of movement or for no movement of the aircraft control surface at the moment of transfer. It is evident, for example, that if at the moment of shifting the manual control is calling for right rudder and the autopilot control is calling for left rudder, a violent rudder movement and violent resulting change in craft attitude would result from the transfer of control. It is thus necessary for smooth shifting to effect the transfer only when the independent controlling influences are synchronized to the extent that both the controls are calling for the same direction of control surface movement or for no control surface movement.

It is therefore a general object of my invention to provide new and improved means for synchronizing the transfer of control of a hydraulic servomotor from one to another of a plurality of selectable control members.

It is another object of my invention to provide new and improved means for automatically synchronizing the transfer of hydraulic servomotor control from one to another of a pair of independently operated control valves.

It is a more particular object of my invention to provide new and improved means for synchronizing the transfer of hydraulic servomotor control between manual to automatic in a manner to prevent violent repositioning of the controlled member.

My invention itself will be more fully understood and its various objects and advantages further appreciated by referring now to the following detailed specification taken in conjunction with the accompanying drawing, the single figure of which is a schematic diagram of a hydraulic servomotor control system embodying my invention.

Referring now to the drawing, I have shown my invention by way of illustration as applied to a combined manual and automatic hydraulic servomotor control for an aircraft control surface shown schematically as an aircraft rudder 1. While manual control through the hydraulic system is provided, the rudder is provided also with direct emergency manual control through a pair of cables 2 and a control member 3, such direct manual control being rendered operable in the event of failure of the hydraulic system, as will be more fully described hereinafter.

The hydraulic system comprises a hydraulic servomotor 4 having a reversible piston 5 connected directly to move the rudder 1. The servomotor piston 5 is mounted in a servomotor cylinder having fluid transfer ports 6 and 7 disposed on opposite sides of the piston. Through a pair of fluid conduits 8 and 9 the servomotor ports 6 and 7 respectively, are connected to a pair of fluid transfer ports 10 and 11, respectively, of an automatic bypass valve 12.

The bypass valve 12 comprises a fluid-tight cylinder 13 having slidably mounted therein a valve spool 14 normally biased to one limit of its travel by means of a compression spring 15. The cylinder 13 is provided with the fluid transfer ports 10 and 11 and also with an opposite pair of transfer ports 16 and 17. The valve spool 14 is provided with lands so located on the spool that when the spool is in its biased position the fluid transfer ports 10 and 11 are connected together, thereby to provide free transfer of the fluid between opposite sides of the servomotor piston 5. It is this position which the bypass valve assumes in the event that the hydraulic system fails, so that direct manual control of the rudder 1 may be effected without resistance from the servomotor piston 5.

The bypass valve 12 is further provided at one end with a fluid inlet port 18 which is connected by means of a conduit 19 to a suitable source of fluid under pressure, such as a pump 20. When the hydraulic system is in normal operation, fluid supplied to the valve 12 through the port 18 actuates the valve against its bias to its opposite limit of travel, as determined by a stop 21, and as partially shown in dotted outline. In this position the valve spool 14 connects the port 10 to the port 16 and the port 11 to the port 17, and interrupts direct connection between the ports 10 and 11. The bypass valve 12 is provided also with a drain port 21a through which any fluid leaking past the valve spool 14 is returned by means of a drain conduit 20b (shown dotted) to a sump 20a. It will now be evident that the bypass valve 12 serves only as an emergency control to short-circuit opposite sides of the servomotor cylinder in the event of failure of the hydraulic system.

The fluid transfer ports 16 and 17 of the bypass valve 12 are connected, respectively, through fluid conduits 22 and 23 to a pair of fluid transfer ports 24 and 25, respectively, on a transfer valve 26. The transfer valve 26 serves alternatively to connect the servomotor 4 for control by either one or the other of a pair of relay valves 27, 28. The transfer valve 26 itself comprises a fluid-tight cylinder 29 having slidably mounted therein a valve spool 30 provided with two spaced apart operative positions. The valve spool 30 is biased to one of its operative positions by a pair of compression springs 31, and is adapted to be moved against its bias to its other operative position, as determined by a stop 32, in response to fluid under pressure supplied through a fluid transfer port 33, as will be more fully described hereinafter. The valve spool 30 is provided with a plurality of lands positioned selectably to connect the fluid transfer ports 24 and 25 either with a pair of fluid transfer ports 34 and 35, respectively, or with a pair of fluid transfer ports 36 and 37, respectively. All the ports 34 to 37 inclusive, are formed in the transfer valve cylinder 29, as are the ports 24 and 25. The transfer valve cylinder is provided also with a drain port 38 through which fluid leaking past the valve spool may be returned to the sump 20a, and with a latching port 39 operable in conjunction with the fluid port 33, as will be described more fully hereinafter.

The fluid transfer ports 34 and 35 are connected through fluid conduits 40 and 41, respectively, to a pair of fluid transfer ports 42, 43, respectively, on the relay valve 28, and the transfer valve ports 36 and 37 are connected through fluid conduits 44 and 45, respectively, to a pair of fluid transfer ports 46 and 47, respectively, on the relay valve 27. Each relay valve is provided with a slidable valve spool which in a central null position seals off its associated pair of fluid transfer ports 42, 43 or 46, 47, and in oppositely displaced positions supplies fluid under pressure to one or to the other of its transfer ports, simultaneously connecting its other transfer port to the drain conduit 20b. The relay valve 27 is manually controlled, and the relay valve 28 is automatically controlled through a suitable autopilot system.

Referring now more particularly to the relay valve 27, this valve comprises a fluid-tight cylinder 48 within which is slidably mounted a movable valve spool 49. The valve spool 49 is manually movable by means of a valve stem 50. The valve cylinder 48 is provided with the fluid transfer ports 46 and 47 as described, and is provided also with a fluid inlet port 51 and a pair of fluid drain ports 52, 53 adapted to be connected through the drain conduit 20b to the sump 20a. Opposite ends of the valve cylinder beyond the ends of the valve spool 49 are connected to the drain ports 52 and 53 by passageways 52a, 53a, respectively, formed in the valve cylinder. In the central null position of the valve spool 49, this spool seals off the inlet port 51 and the fluid transfer ports 46 and 47 as well as the drain ports 52 and 53. When the valve spool 49 is moved to the left, as shown in the drawing, fluid under pressure is supplied from the inlet port 51 to the transfer port 46, and the transfer port 47 is connected to the drain port 52. When the valve spool 49 is moved to the right of its central null position, as shown in the drawing, fluid under pressure is supplied from the inlet port 51 to the fluid transfer port 47 and the fluid transfer port 46 is connected to the drain port 53.

The relay valve 28 is generally similar to the relay valve 27 except that it is provided in addition with certain control ports through which movement of the valve spool may be controlled by suitable application and release of fluid pressure at opposite ends of the valve spool. More particularly, the relay valve 28 comprises a fluid-tight valve cylinder 54 within which is slidably mounted a valve spool 55 movable in opposite directions from a central null position in which it is shown in the drawing. The valve cylinder 54 is provided with the fluid transfer ports 42, 43 as described, and with a pair of fluid inlet ports 56, 57, a pair of control ports 58, 59 and a drain port 60. The drain port 60 is connected through the drain conduit 20b to the fluid sump 20a. The fluid inlet ports 56 and 57 are connected through a fluid supply conduit 61 to the pump 20. By passageways 56a and 57a, respectively, the fluid supply ports 56 and 57 are connected to opposite ends of the valve cylinder beyond the ends of the valve spool 55, these passageways being positioned to be covered by the terminal lands on the valve spool in the opposite limiting positions of the spool. It will now be understood that when the valve spool 55 of the relay valve 28 is in its central null position as shown, the fluid inlet conduits 56 and 57 are sealed, as are also the fluid transfer conduits 42, 43 and the drain conduit 60. Through the passageways 56a and 57a fluid under pressure is supplied from the inlet conduits 56 and 57, respectively, to opposite ends of the valve spool so that the valve spool is under opposing but balanced pressures.

The control ports 58 and 59 of the relay valve 28 are connected through conduits 62 and 63, respectively, to a pair of fluid transfer ports 64 and 65, respectively, of a reversible solenoid control valve 66. The solenoid valve 66 comprises a fluid-tight cylinder 67 within which is slidably mounted a valve spool 68 movable from a central null position shown in the drawing to opposite control positions in which either the port 64 or the port 65 is connected through the valve with a drain port 69. The valve spool 68 is normally centered in a null position in which the ports 64, 65 and 69 are sealed off, and is maintained in this position by a pair of opposing centering springs (not shown). The valve spool 68 is connected to be moved in opposite directions by means of a pair of solenoids 70 and 71 forming part of an automatic pilot control system. A suitable autopilot control system including such an oppositely acting solenoid valve is shown in Patent No. 2,464,629 issued to Young and assigned to the same assignee as the present application, wherein the solenoids 27 and 28 (Fig. 1b) correspond to the solenoids 70 and 71 of the instant application.

For the purpose of actuating the transfer valve 26 between its two operative positions and thereby selectably connecting either the relay valve 27 or the relay valve 28 to control the servomotor 4, I provide a solenoid actuated selector valve 72 and a balanced matching valve 73. The selector valve 72 is arranged selectably to connect the port 33 of the transfer valve 26 either to a source of fluid under pressure or to the sump 20a, both such connections being made through the balanced matching valve 73. The matching valve 73 is normally centered, and when so centered it completes connection of the selector valve 72 with the transfer valve port 33. The matching valve 73 is differentially responsive to fluid pressure at two selected relay valve transfer ports which are adapted for alternative connection to the same servomotor port, and pressures of unlike kinds at such relay valve ports displace the matching valve and thereby render the transfer valve 26 insensitive to the selector valve 72.

Referring now more particularly to the selector valve 72, this valve comprises a fluid-tight cylinder 74 having slidably mounted therein a valve spool 75 movable between two operative positions to cover and uncover a plurality of fluid ports. The valve spool is biased to a normal position shown in the drawing by means of suitable springs (not shown) and is adapted to be moved (to the right as shown in the drawing) to its other position by means of a solenoid 76. The valve cylinder is provided with a fluid inlet port 77, a pair of fluid drain ports 78, 79, and a fluid transfer port 80. In the normal position of the selector valve spool 75 the fluid inlet port 77 is sealed off by the valve spool and the fluid drain port 79 is connected through passageways 81 and 82 in the valve cylinder and the valve spool, respectively, to the fluid transfer port 80. The selector valve transfer port 80 is connected by a fluid conduit 83 to the transfer valve latching port 39 and, as will be later described, by a conduit 84 to a fluid transfer port on the matching valve 73. A manually operable switch 76a is shown for energizing the selector valve solenoid 76.

Referring now more particularly to the matching valve 73, this valve comprises a fluid-tight cylinder 85 within which is slidably mounted a valve spool 86 normally centered in the position shown in the drawing by means of a pair of opposing compression springs 87. Opposite ends of the matching valve cylinder 85 are connected through conduits 88 and 89 to the transfer ports 47 and 43, respectively, on the relay valves 27 and 28, respectively. It may be noted here, as will be more evident hereinafter, that the relay valve ports 47 and 43 are adapted to be alternatively connected through the transfer valve 26 and the bypass valve 12 to the same servomotor port 7. These relay valve ports 47 and 43 are therefore transfer ports of similar function, in that they each operate when fluid under pressure is supplied through them to move the servomotor piston 5 in the same direction.

The matching valve 73 is provided also with a fluid transfer port 90 which is connected by the conduit 84 to the selector valve port 80 and by the conduits 84 and 83 to the transfer valve latching port 39. Finally, the matching valve cylinder 85 is provided with a fluid transfer port 91 which is connected by a fluid conduit 92 to the port 33 of the transfer valve 26. The matching valve spool 86 is circumferentially grooved at 93 at a point which registers with the port 91 when the spool is in its normal midposition shown, and this groove 93 is connected by an internal passageway 94 in the valve spool with a portion of the spool which is normally in communication with the valve port 90. It will thus be observed that when the matching valve spool 86 is in its normal centered position its ports 90 and 91 are in free communication with each other through the groove 93 and the passageway 94, but when the spool is displaced from its center position in either direction, the port 91 is closed off.

In view of the foregoing detailed description of the structure and interconnection of my new and improved apparatus, its mode of operation will now be readily understood from the following brief description.

The apparatus is shown in the drawing in condition for manual power boost control of the rudder 1 through the relay valve 27. In this connection it will be observed that the selector valve solenoid 76 is de-energized and the selector valve is in the position shown in the drawing. If it is further assumed that neither the autopilot nor the operator is at the moment demanding any movement of the rudder 1, both relay valves 27 and 28 are in the null positions shown, so that the matching valve 73 is centered as shown in the drawing. With the matching valve centered and the selector valve 72 in its biased position shown, the transfer valve port 39 is connected to the sump through the conduit 83, the selector valve port 80 and the selector valve passageways 82 and 81, and the transfer valve port 33 is connected to the sump through the conduit 92, the matching valve port 91, the matching valve passageways 93 and 94, the matching valve port 90, the conduit 84, the selector valve port 80 and the selector valve passageways 82 and 81. Thus no fluid pressure is supplied to the left end of the transfer valve 26 and this valve is in its biased position shown in solid lines on the drawing. In this position of the transfer valve its ports 34 and 35 are sealed off, thereby to disable the relay valve 28, and the transfer valve ports 36 and 37 are connected respectively to the ports 24 and 25. The transfer valve 26 is thus positioned to connect the ports 46 and 47 of the manual relay valve 27 to the servomotor ports 6 and 7, respectively.

So long as the relay valve 27 remains in its null mid-position shown, no movement of the servomotor piston 5 is effected. If, however, the relay valve spool 49 is moved to the left, as shown in the drawing, the relay valve ports 46 and 51 are interconnected, thereby to apply fluid pressure through the conduit 44, the transfer valve 26, the conduit 22, the bypass valve 12 and the conduit 8 to the servomotor port 6. At the same time, the port 47 of the relay valve 27 is connected to the drain port 52, so that the servomotor port 7 is connected to the sump through the conduit 9, the bypass valve 12, the conduit 23, the transfer valve 26, the conduit 45, and the ports 47 and 52 of relay valve 27. Thus, the servomotor piston 5 will move to the right as shown in the drawing. It will be evident to those skilled in the art that movement of the relay valve spool 49 to the right of its midposition effects an opposite movement of the servomotor piston 5 in an entirely similar manner. In this condition of the apparatus movement of the relay valve spool 55 of the autopilot controlled relay valve 28 has no effect upon the servomotor 4 because the fluid conduits 40 and 41 from the relay valve 28 are sealed off at the transfer valve ports 34 and 35.

If now it is desired to transfer from manual to automatic or autopilot operation of the apparatus, the manual switch 85 is closed, thereby to energize the selector valve solenoid 76 and move the selector valve 72 to the right as shown in the drawing. Such movement of the selector valve connects its fluid inlet port 77 with the fluid transfer port 80, thus supplying fluid under pressure to the latching port 39 of the transfer valve 26 and also to the port 90 of the matching valve 73. If upon such actuation of the selector valve 72 the matching valve 73 is centered as shown in the drawings, fluid under pressure is supplied from the port 90 of the matching valve through passageway 94 to its port 91, and through the conduit 92 to the port 33 of the transfer valve 26. Fluid under pressure at the transfer valve port 33 forces the valve spool 30 of the transfer valve to the right against its bias to the dotted position shown in the drawing. When the transfer valve spool 30 arrives in its right-hand position, it is maintained in that position, or latched, by direct supply of fluid under pressure from the selector valve port 80 through the conduit 83 and the transfer valve latching port 39. It is evident that fluid thus supplied through the transfer valve latching port 39 is controlled by the selector valve 72 only, and is then independent of displacement of the matching valve 73.

The foregoing movement of the transfer valve spool 30, however, depends upon free interconnection between the ports 90 and 91 of the matching valve 73. Such interconnection only exists if the matching valve spool 86 is in its normal centered position. The matching valve spool 86 will be in this centered position so long as the fluid supplied to opposite ends of the valve cylinder 85 from the relay valve transfer ports 43 and 47 (on the relay valves 28 and 27, respectively) is under pressure of like kind. That is, if the fluid at both relay valve ports 43 and 47 is under positive pressure, or if the fluid at both these ports is under zero pressure, the matching valve will remain balanced. If, however, fluid at one of the relay valve ports 43 or 47 is under positive pressure, while the other is at zero (i. e. sump) pressure, the matching valve will be displaced to the right or to the left depending upon which of the relay valve ports is under positive pressure. Such displacement of the matching valve 73 from its normal centered position interrupts the connection between the matching valve ports 90 and 91 and prevents supply of fluid under pressure to the transfer valve port 33, even though the selector valve 72 has been moved to a position to supply such fluid. This means of course that the matching valve 73 will be displaced from its normal centered position whenever the manual relay valve 27 is calling for a servomotor action (or inaction) different from that being called for by the autopilot relay valve 28. More specifically, if both the manual relay valve 27 and the autopilot relay valve 28 are in their null midpositions shown, so that neither is calling for any movement of the servomotor piston 5, the matching valve 73 will remain balanced. Similarly, if both relay valves 27 and 28 are displaced in directions to apply positive pressure at both the transfer ports 43 and 47, the matching valve 73 will remain balanced, and if both relay valves are displaced in directions to connect both the ports 43 and 47 to the sump, the matching valve 73 will remain balanced. In any of these circumstances, then, the transfer valve spool 30 will be moved immediately upon movement of the selector valve 72.

If, however, the manual relay valve 27 is calling for movement of the servomotor piston 5 to the left (positive pressure at the relay valve port 47), while the autopilot relay valve 28 is calling for servomotor movement to the right (sump pressure at the relay valve port 43) the matching valve 73 will be displaced to the right and fluid under pressure will not be supplied to the transfer valve port 33 until a balanced condition is restored. The opposite condition of unbalance will be evident to those skilled in the art.

Thus, it will be seen that with my new and improved apparatus movement of the transfer valve 26 from one operative position to another to transfer control of the servomotor 4 from the manual relay valve 27 to the autopilot relay valve 28 cannot be carried out, even though called for by the selector valve 72, until a like condition of the relay valves is indicated by automatic balancing of the matching valve 73. This precludes violent repositioning of the rudder 1 which might otherwise result from transferring at a moment when one relay valve was calling for one direction of rudder movement while the other was calling for the other direction of rudder movement.

It might appear from the above description of the operation that there could be circumstances in which a shift of the matching valve 73 from the centered position which is shown is called for by a difference in the positions of relay valves 27 and 28, but in which no such displacement is achieved because one of the end chambers of the matching valve casing 85 is effectively sealed up to prevent the required change in volume for matching valve movement. This apparent difficulty would occur whenever the relay valve 27 or 28, to which control of the servo piston 5 is to be shifted, is in the neutral position shown in the drawing. For instance, with the transfer valve spool 30 in the position shown in solid lines, so that the piston 5 is under the control of the manually operated relay valve 27, a shift of transfer valve spool 30 would cause a shift of control to the automatically actuated relay valve 28. However, the right-hand end chamber of matching valve casing 85 apparently cannot change in volume since the only outlet conduit 89 is apparently closed at transfer valve port 35 and at conduit 41 and port 43 of relay valve 28 by means of the closure of relay valve ports 56 and 60. It will be understood, however, that although the above description has repeatedly referred to the operation of the valve spools as "sealing off" the various associated ports, it is an impossibility from a practical standpoint to provide movable hydraulic valve spools of the type disclosed in this system which are completely leakproof. It will be understood therefore that the combined leakages of the valve spool 86 adjacent to the right-hand end chamber of matching valve casing 85, the spool 30 in the vicinity of port 35 of transfer valve 26, and the spool 55 in the vicinity of ports 56 and 60 of relay valve 28, are sufficient to permit displacement of the matching valve spool 86 by the very small amount which is necessary to shift the circumferential groove 93 out of alignment with the port 91 when required to prevent operation of the transfer valve 26 as described above.

It will now readily be appreciated by those skilled in the art that reverse transfer is carried out in an entirely similar and automatically controlled manner. Specifically, if it is desired to retransfer from control by the autopilot relay valve 28 to control by the manual relay valve 27, the selector valve solenoid 76 is de-energized and the selector valve 72 permitted to assume its biased position shown in the drawing. If at the moment the selector valve returns to this position, the matching valve 73 is balanced as shown, the transfer valve port 33 is connected to the sump through the conduit 92, the matching valve ports 91 and 90, the conduit 84 and the selector valve ports 80 and 79. The transfer valve latching port 39 is also directly connected to the sump through the selector valve ports 80 and 79. The transfer valve spool 30 then moves under the influence of its biasing springs 31 to the position shown in solid lines in the drawing. If, however, at the moment that the selector valve spool 75 is returned to the position shown, the matching valve spool 86 is displaced due to unlike pressure conditions at the relay valve ports 43 and 47, the transfer valve port 33 is sealed off from the sump by sealing off of the matching valve port 91. Retransfer, therefore, cannot take place until the matching valve 73 is restored to its balanced condition. As soon as such restoration is made, however, transfer automatically takes place.

It will of course be understood by those skilled in the art that, when I refer in the foregoing to a "hydraulic" system or apparatus I refer to one which operates in response to the supply of any suitable liquid fluid, such as oil, under pressure.

While I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve for alternatively connecting either said pair of relay valve ports to said servomotor ports thereby selectively to connect one or the other of said relay valves to control said servomotor, and means differentially responsive to fluid pressure at two of said relay valve ports adapted for alternative connection to the same one of said servomotor ports for controlling said transfer valve.

2. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve having spaced apart operative positions for alternatively connecting either said pair of relay valve ports to said servomotor ports thereby selectively to connect one or the other of said relay valves to control said servomotor, means for biasing said transfer valve to one said operative position, and means differentially responsive to fluid pressure at two relay valve transfer ports of like function for supplying fluid under pressure to actuate said transfer valve to the other said operative position.

3. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve having spaced apart operative positions for alternatively connecting either said pair of relay valve ports to said servomotor ports thereby selectively to connect one or the other of said relay valves to control said servomotor, means for biasing said transfer valve to one said operative position, means differentially responsive to fluid pressure at two of said relay valve ports adapted for alternative connection to the same one of said servomotor ports for moving said transfer valve to the other said operative position when pressures of like kind exist at said two relay valve ports, and means independent of said differential responsive means for maintaining said transfer valve in said other operative position.

4. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve having spaced apart operative positions for alternatively connecting either said pair of relay valve ports to said servomotor ports thereby selectively to connect one or the other of said relay valves to control said servomotor, a selector valve, means connecting said selector valve to supply fluid under pressure to control movement of said transfer valve between said operative positions, and means differentially responsive to fluid pressure at two relay valve transfer ports of like function for controlling said connecting means.

5. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve having spaced apart operative positions for alternatively connecting said pairs of relay valve ports to said pair of servomotor ports, selector means for controlling movement of said transfer valve between said positions, means connecting said selector means to said transfer valve, and means differentially responsive to fluid pressure at two relay valve transfer ports adapted for connection to the same one of said servomotor ports for disabling said connecting means when fluid pressures of unlike kind exist at said two relay valve ports.

6. In a hydraulic apparatus for actuating a movable member, a hydraulic servomotor having a reversible piston adapted to be connected to move said member and having a pair of fluid tranfer ports disposed on opposite sides of said piston, a pair of relay valves each having a pair of fluid transfer ports, means including a transfer valve having spaced apart operative positions for alternatively connecting said pairs of relay valve ports to said pair of servomotor ports, means biasing said transfer valve to one said operative position, a selector valve, means including a balanced valve connecting said selector valve to supply fluid under pressure to actuate said transfer valve against its bias to the other said operative position, said balanced valve being differentially responsive to fluid pressure at two relay valve ports of like function to control said supply of fluid to said transfer valve, and means controlled by said selector valve and said transfer valve independently of said balanced valve for supplying fluid under pressure to maintain said transfer valve in said other operative position.

7. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve having spaced apart operative positions, said transfer valve in one position connecting the transfer ports of one relay valve to the transfer ports of said servomotor and in the other position connecting the transfer ports of the other said relay valve to the transfer ports of said servomotor, each said relay valve when connected being movable to supply fluid under pressure to one or the other of its transfer ports and through said transfer valve to one or the other of said servomotor transfer ports to move said piston in opposite directions, means biasing said transfer valve to one said operative position, a selector valve, means connecting said selector valve to supply fluid to and exhaust fluid from said transfer valve to control movement of said transfer valve between said operative positions, said connecting means including a matching valve operable when displaced from a normal centered position to disable said connecting means, means biasing said matching valve to said centered position, means differentially responsive to fluid pressure at transfer ports of like function on the connected and unconnected relay valves to displace said matching valve from said centered position, and means controlled by said selector valve and said transfer valve independently of said matching valve for supplying fluid under pressure to maintain said transfer valve in position against its bias.

8. In a hydraulic apparatus for actuating a movable member, a hydraulic servomotor having a reversible piston adapted to be connected to move said member and having a pair of fluid transfer ports disposed on opposite sides of said piston, a pair of relay valves each having a fluid inlet port and a pair of fluid transfer ports, said relay valves each having a null position and opposite operative positions in which its inlet port is alternatively connected to one or the other of its transfer ports, means supplying fluid under pressure to said inlet ports, manually operable means for actuating one said relay valve, means automatically responsive to a controlling condition for actuating the other said relay valve, means including a fluid transfer valve having two spaced apart operative positions for alternatively connecting said pairs of relay valve transfer ports to said servomotor ports, means biasing said transfer valve to one of its operative positions, selector means for supplying fluid under pressure to move said transfer valve against its bias and exhausting fluid from said transfer valve for reverse movement, a matching valve differentially responsive to fluid pressure at connected and unconnected relay valve transfer ports of like function to disable said selector means whenever fluid pressures of unlike kinds exist at said relay valve ports of like function, and means controlled by said selector means independently of said matching valve for supplying fluid under pressure to maintain said transfer valve in position against its bias.

9. In a hydraulic apparatus for actuating a movable member, a hydraulic servomotor having a reversible piston adapted to be connected to move said member and having a pair of fluid transfer ports disposed on opposite sides of said piston, a pair of relay valves each having a pair of fluid transfer ports, means including a transfer valve having two spaced apart operative positions for alternatively connecting either said pair of relay valve ports to said servomotor ports thereby selectively to connect one or the other of said relay valves to control said servomotor, means for biasing said transfer valve to one said operative position, selector means for alternatively supplying fluid under pressure to said transfer valve to move said valve against its bias and exhausting fluid from said valve for opposite movement, and means differentially responsive to fluid pressure at two relay valve transfer ports adapted to be connected to the same servomotor port for disabling said selector means whenever fluid pressures of unlike kind exist at said two relay valve ports.

10. In a control system for a dirigible craft having a control surface, a hydraulic servomotor having a reversible piston adapted to be connected to move said surface and having a pair of fluid transfer ports disposed on opposite sides of said piston, a pair of relay valves each having a pair of fluid transfer ports, manually operable means for actuating one said relay valve, means responsive to a component of craft attitude for automatically actuating the other said relay valve, each said relay valve when actuated supplying fluid under pressure at one or the other of its transfer ports, means including a transfer valve for alternatively connecting either said pair of relay valve ports to said servomotor ports thereby selectively to connect one or the other of said relay valves to control said servomotor, and means differentially responsive to fluid pressure at two of said relay valve ports adapted for alternative connection to the same one of said servomotor ports for controlling said transfer valve.

11. In a control system for a dirigible craft having a control surface, a hydraulic servomotor having a reversible piston adapted to be connected to move said surface and having a pair of fluid transfer ports disposed on opposite sides of said piston, a pair of relay valves each having a pair of fluid transfer ports, manually operable means for actuating one said relay valve, means responsive to a component of craft attitude for automatically actuating the other said relay valve, each said relay valve when actuated supplying fluid under pressure at one or the other of its transfer ports, means including a transfer valve having two spaced apart operative positions for alternatively connecting either said pair of relay valve ports to said servomotor ports thereby selectively to connect one or the other of said relay valves to control said servomotor, manually operable selector means for supplying fluid under pressure to and exhausting fluid from said transfer valve to control movement of said valve between said operative positions, and means differentially responsive to fluid pressure at two relay valve transfer ports of like function for disabling said selector means whenever fluid pressures of unlike kind exist at said two relay valve ports.

12. In a control system for a dirigible craft having a control surface, a hydraulic servomotor having a reversible piston adapted to be connected to move said surface and having a pair of fluid transfer ports disposed on opposite sides of said piston, a pair of relay valves each having a pair of fluid transfer ports, manually operable means for actuating one said relay valve, means responsive to a component of craft attitude for automatically actuating the other said relay valve, each said relay valve having a null midposition and when actuated away from said null midposition supplying fluid under pressure at one or the other of its transfer ports, means including a transfer valve having two spaced apart operative positions for alternatively connecting either said pair of relay valve ports to said servomotor ports thereby selectively to connect one or the other of said relay valves to control said servomotor, means biasing said transfer valve to one of said operative positions, manually operable selector means for supplying fluid under pressure to and exhausting fluid from said transfer valve to move said valve against its bias and to permit reverse movement respectively, means differentially responsive to fluid pressure at two relay valve ports adapted for alternative connection to the same one of said servomotor ports for rendering said selector means operable to supply and exhaust fluid only when pressures of like kind exist at said two relay valve ports, and means controlled directly by said selector means independently of said differentially responsive means for supplying fluid under pressure to maintain said transfer valve in position against its bias.

EDWARD J. FENZL.

References Cited in the file of this patent

UNITED STATES PATENTS

| Number | Name | Date |
|---|---|---|
| 2,325,108 | Carlson | July 27, 1943 |
| 2,611,560 | Harcum | Sept. 23, 1952 |